US 10,201,752 B2

(12) United States Patent
Lucey et al.

(10) Patent No.: US 10,201,752 B2
(45) Date of Patent: Feb. 12, 2019

(54) SYSTEM FOR INTERACTIVE SPORTS ANALYTICS USING MULTI-TEMPLATE ALIGNMENT AND DISCRIMINATIVE CLUSTERING

(71) Applicant: STATS LLC, Chicago, IL (US)

(72) Inventors: Patrick Lucey, Chicago, IL (US); Long Sha, Brisbane (AU); Xinyu Wei, Melbourne (AU)

(73) Assignee: STATS LLC, Chicago, IL (US)

( * ) Notice: Subject to any disclaimer, the term of this patent is extended or adjusted under 35 U.S.C. 154(b) by 71 days.

(21) Appl. No.: 15/379,448

(22) Filed: Dec. 14, 2016

(65) Prior Publication Data

US 2017/0165570 A1 Jun. 15, 2017

Related U.S. Application Data

(60) Provisional application No. 62/266,817, filed on Dec. 14, 2015, provisional application No. 62/351,724, filed on Jun. 17, 2016.

(51) Int. Cl.
*A63F 13/35* (2014.01)
*A63F 13/216* (2014.01)
(Continued)

(52) U.S. Cl.
CPC ............ *A63F 13/35* (2014.09); *A63F 13/216* (2014.09); *A63F 13/25* (2014.09); *A63F 13/812* (2014.09);
(Continued)

(58) Field of Classification Search
USPC ........................................................ 700/93
See application file for complete search history.

(56) References Cited

U.S. PATENT DOCUMENTS 6,710,713 B1 3/2004 Russo et al.
9,342,785 B2 5/2016 Lucey et al.
(Continued)

FOREIGN PATENT DOCUMENTS

WO WO 2014/008134 A1 1/2014

OTHER PUBLICATIONS

Bialkowski, A., Lucey, P., Carr, P., Yue, Y., and Matthews, I. (2014). Large-scale analysis of soccer matches using spatiotemporal tracking data. In ICDM.

(Continued)

*Primary Examiner* — Pierre E Elisca
(74) *Attorney, Agent, or Firm* — DLA Piper LLP US

(57) ABSTRACT

A system is described for interactively analyzing plays of a sporting event based on real-world positional tracking data. Using positional information regarding the players and/or ball and/or other objects obtained from a tracking system, along with identified event data and contextual information, the system processes a library of plays (e.g., one or more seasons' worth of a league's contests) into a searchable database of plays using multiple alignment templates and discriminative clustering techniques. A user interface is described for interacting with the database in a graphical manner, whereby users can query a graphical depiction of a play and receive the most similar plays from the library, along with statistical information relating to the plays. The user interface further permits the user to modify the query graphically (e.g., moving or exchanging players, ball trajectories, etc.) and obtain updated statistical information for comparison.

11 Claims, 14 Drawing Sheets

(51) Int. Cl.
    A63F 13/25      (2014.01)
    A63F 13/812     (2014.01)
    G06N 7/00       (2006.01)
    G06N 99/00      (2010.01)
    G06F 17/30      (2006.01)
    A63F 13/65      (2014.01)

(52) U.S. Cl.
    CPC ........... *G06N 7/005* (2013.01); *G06N 99/005* (2013.01); *A63F 13/65* (2014.09); *G06F 17/3082* (2013.01)

(56) References Cited

U.S. PATENT DOCUMENTS

| | | |
|---|---|---|
| 2005/0143198 A1 | 6/2005 | Charge |
| 2006/0149674 A1* | 7/2006 | Cook ............... G06Q 20/40 705/44 |
| 2010/0283630 A1 | 11/2010 | Alonso |
| 2011/0169959 A1 | 7/2011 | DeAngelis et al. |
| 2011/0267461 A1 | 11/2011 | Birenboim et al. |
| 2013/0104870 A1 | 5/2013 | Rizzo et al. |
| 2013/0225271 A1 | 8/2013 | Amartis |
| 2014/0142921 A1 | 5/2014 | Gleadall et al. |
| 2014/0236331 A1 | 8/2014 | Lehmann et al. |
| 2014/0364976 A1 | 12/2014 | Wohl et al. |
| 2016/0260015 A1 | 9/2016 | Lucey et al. |
| 2017/0043260 A1* | 2/2017 | Austerlade ............... H04L 43/04 |

OTHER PUBLICATIONS

Cox, M., Lucey, S., Sridharan, S., and Cohn, J. (2008). Least Squares Congealing for Unsupervised Alignment of Images. In CVPR.

Hinton, G. E., Osindero, S., and Teh, Y.-W. (2006). A fast learning algorithm for deep belief nets. Neural Comput., 18(7):1527-1554.

Learned-Miller, E. (2006). Data Driven Image Models through Continuous Joint Alignment. PAMI, 28(2).

Lucey, P., Bialkowski, A., Carr, P., Morgan, S., Matthews, I., and Sheikh, Y. (2013). Representing and Discovering Adversarial Team Behaviors using Player Roles. In CVPR.

Miller, A., Bornn, L., Adams, R., and Goldsberry, K. (2014). Factorized Point Process Intensities: A Spatial Analysis of Professional Basketball. In ICML.

Peng, Y., Ganesh, A., Wright, J., Xu, W., and Ma, Y. (2012). RASL: Robust Alignment by Sparse and Low-Rank Decomposition for Linearly Correlated Images. PAMI, 34(11).

Sha, L., Lucey, P., Yue, Y., Carr, P., Rohlf, C., and Matthews, I. (2016). Chalk-boarding: A new spatiotemporal query paradigm for sports play retrieval. In IUI.

Wei, X., Lucey, P., Morgan, S., Carr, P., Sridharan, S., and Reid, M. (2015). Predicting serves in tennis using style priors. In KDD.

Yue, Y., Lucey, P., Carr, P., Bialkowski, A., and Matthews. I. (2014). Learning Fine-Grained Spatiscale analysis of soccer matches using spatiotemporal tracking data. In ICDM.

United States Patent and Trademark Office, International Search Report and Written Opinion in International Application No. PCT/US2016/066733 (dated Apr. 17, 2017).

Lucey et al., "Quality vs Quantity: Improved Shot Prediction in Soccer using Strategic Features from Spatiotemporal Data", 9th Annual MIT Sloan Sports Analytics Conference, 2015, 9 pages.

* cited by examiner

SYSTEM FOR INTERACTIVE SPORTS ANALYTICS USING MULTI-TEMPLATE ALIGNMENT AND DISCRIMINATIVE CLUSTERING

CROSS-REFERENCE TO RELATED APPLICATIONS

This patent application claims the benefit of U.S. Provisional Patent Application No. 62/266,817 filed Dec. 14, 2015, which is incorporated by reference. This patent also claims the benefit of U.S. Provisional Patent Application No. 62/351,724, filed Jun. 17, 2016.

BACKGROUND OF THE INVENTION

Recent years have seen the development and deployment of commercial sports tracking systems for tracking the movement of players, balls, or other objects on a sports playing field. These tracking systems vary in their operation, and include purely optically-based systems (e.g., using multiple cameras), radio-based systems (e.g., using RFID tags embedded in player equipment), satellite-based systems (e.g., GPS) and hybrid systems. Generally, regardless of the type of tracking system employed, the output of such a system includes the (x, y) location of players, recorded at a high-frame rate. In this manner, the players' behavior has been essentially "digitized" allowing individual game plays to be visualized via multi-agent trajectories. Although this behavior can be displayed graphically, describing the subtle movement of players via tags or text labels requires an enormous amount of labels and effort (i.e., a picture is worth a thousand words). Moreover, the usefulness of such a system is limited if there is not an ability to store, catalog and retrieve individual game sequences in an efficient manner.

BRIEF SUMMARY OF THE INVENTION

A system is provided for interactive analysis of sports games using gathered trajectory information. The system processes sequences (e.g., "plays") of a game from gathered tracking data in an efficient manner that permits a user to query a database of plays using a graphical representation of the raw trajectories and to interactively find plays that are similar. A user can use selected "exemplar" plays, or user-drawn plays on an interface.

The system also permits interactive statistical analysis by the user based on a graphical representation of the game players and trajectories. For example, the system allows a user to specify a current play-of-interest (such as by selecting the play from a list of exemplar plays, or by manipulating graphical objects on a screen to represent the play) as a query to the database of plays. Using statistical information associated with the plays in the database, the system can present a statistical probability for a particular event occurring in the queried state. With respect to FIG. 9a, a basketball game state is shown with ten players positioned on the court, five on offense and five on defense. The system queries the database using the game situation (or a subset of the elements of the game situation), and displays a statistical probability of a successful outcome for players in that situation (e.g., 34% for Brown), based on similarly situated plays in the database that were retrieved in response to the query. Other types of statistical event probabilities (e.g., pass probability, foul probability, turnover probability, etc.) can also be estimated and presented based on the query.

The system also permits interactive analysis by tweaking or modifying the queried play to ask "what if . . . ?" types of questions. For example, with respect to FIG. 9b, the user has exchanged one player (Brown) for another (Tucker) in the queried situation. The system updates the event probability accordingly, allowing for an efficient statistical comparison of how different players may affect a particular given game situation. Additionally, an embodiment further includes an interface permitting moving the location of one or more players, as shown in FIG. 9d (Gortat being moved to a new location). Again, the statistical probability information is updated based on the modified situation. More generally, the system permits the identification and analysis of plays that may be most effective against a particular opponent.

To achieve these results, an embodiment of the system includes three phases of operation: a) alignment of trajectories using multiple templates; b) discovery of a "playbook" (i.e., hash table) of plays directly from multi-agent trajectory and event data in an unsupervised manner; and c) using the playbook to obtain player and context-specific statistical information in response to input queries. Each of these phases is an improvement over existing systems, such as what is described in U.S. Patent Pub. No. 2016/0260015, to Lucey et al., which is incorporated by reference for all that it teaches. In an embodiment, the present system's use of multiple templates yields significantly improved alignment through "ensemble alignment" or "aligning and clustering." An embodiment also uses both player and ball trajectories, as well as event information, to construct the hash table of plays by using both a decision-tree framework using aligned data as well as a top-down hierarchical model which comprises pruning insignificant or non-predictive trajectories from plays.

Although the examples described herein relate specifically to the sports of basketball and soccer, the system is not limited to any particular sport, and can be applied to any sport or domain with fine-grain trajectory data (whether it be from optical tracking data (e.g., SportVU) or wearable devices (e.g., RFID, GPS) or any other type of input (e.g., hand-drawn, annotated)).

DETAILED DESCRIPTION OF THE INVENTION

Embodiments of the present system process large amounts of sports-related tracking data in an efficient manner, enabling the querying and retrieval of statistically similar sports plays and the generation of analytical statistical predictions for player and team behavior through an interactive visual interface.

Figure 1:
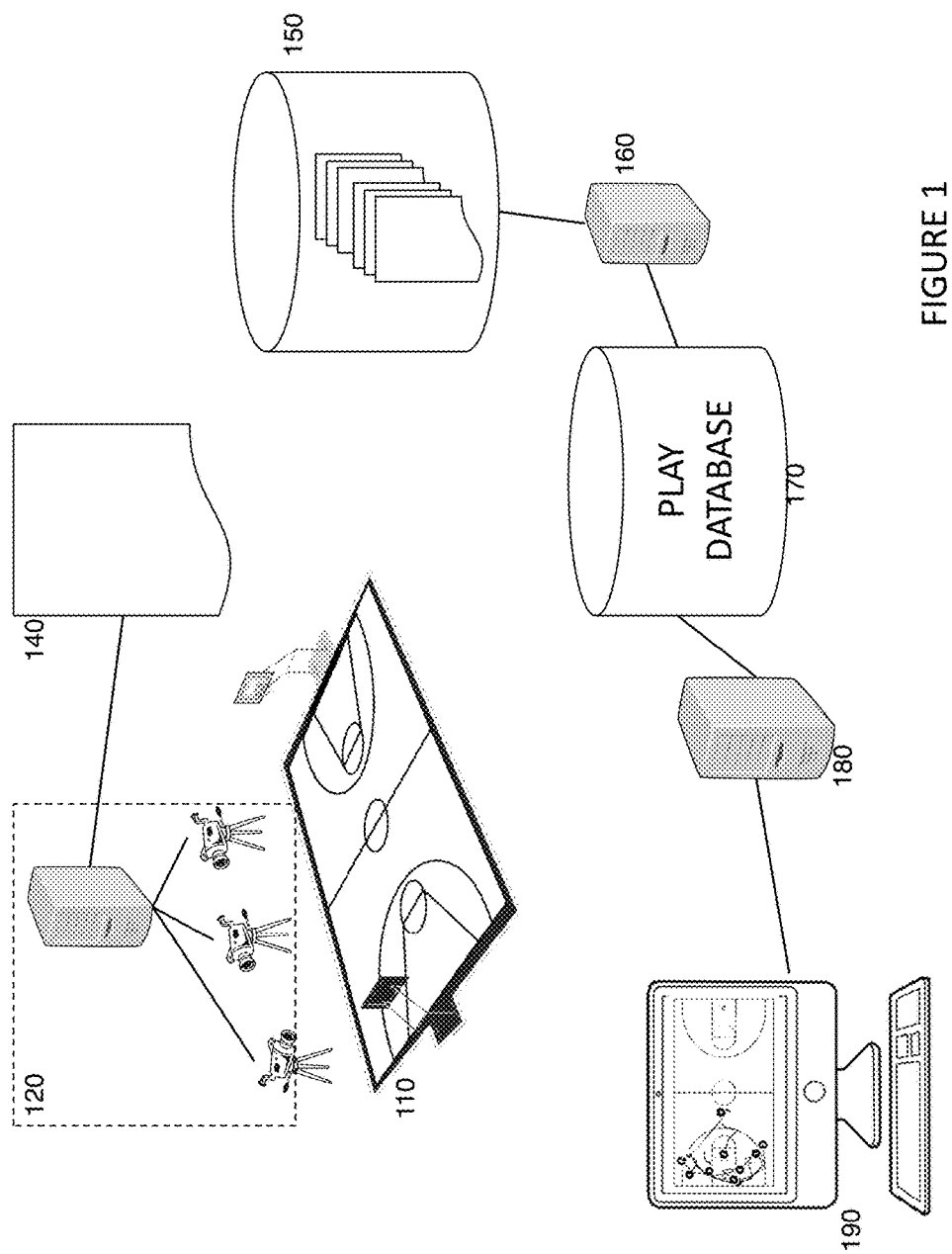
FIG. 1 illustrates an architectural environment for a system for interactive sports analytics, according to an embodiment of the present system.

A general overview of the context of the system is described with respect to FIG. 1, in accordance with an embodiment. At a sporting event taking place at a venue 110, a tracking system 120 records the motions of all players on the playing surface, as well as any other objects of relevance (e.g., the ball, the referees, etc.). Tracking system 120 can be an optically-based system using, for example, a plurality of fixed cameras. Alternatively, tracking system 120 can be a radio-based system using, for example, RFID tags worn by players or embedded in objects to be tracked, or tracking system 120 can be another type of system that tracks moving objects. Preferably, tracking system 120 samples and records at a high frame rate (e.g., 25 frames per second) so as to minimize quantization, enabling expert humans to select the onset and offset of plays at precise times (i.e., frame-level), as well as particular players of interest. Tracking system 120 stores at least player identity and positional information (e.g., (x,y) position) for all players and objects on the playing surface for each frame in a game file 140. The game file 140 is preferably augmented with other event information corresponding to the frames, such as game event information (pass, made shot, turnover, etc.) and context information (current score, time remaining, etc.), and assembled into data store 150 comprising a large number of game files for the given sport (e.g., an entire season of the National Basketball Association games).

A preprocessing engine 160 processes the raw data from the data store 150 through multiple-template alignment and discriminative clustering, in accordance with embodiments described herein, and stores the results in a play database 170. A play database server 180 processes queries to the play database 160. A computing device 190 runs an interactive sports analytics interface and is communicatively connected to the play database server 180. Using the interactive sports analytics interface, a user can submit graphical representations of plays as queries to the play database server 180 and obtain results from the play database 170 that are situationally similar to the queried play, along with statistical information. The user can tweak or modify the query and obtain updated statistical results.

Figure 2:
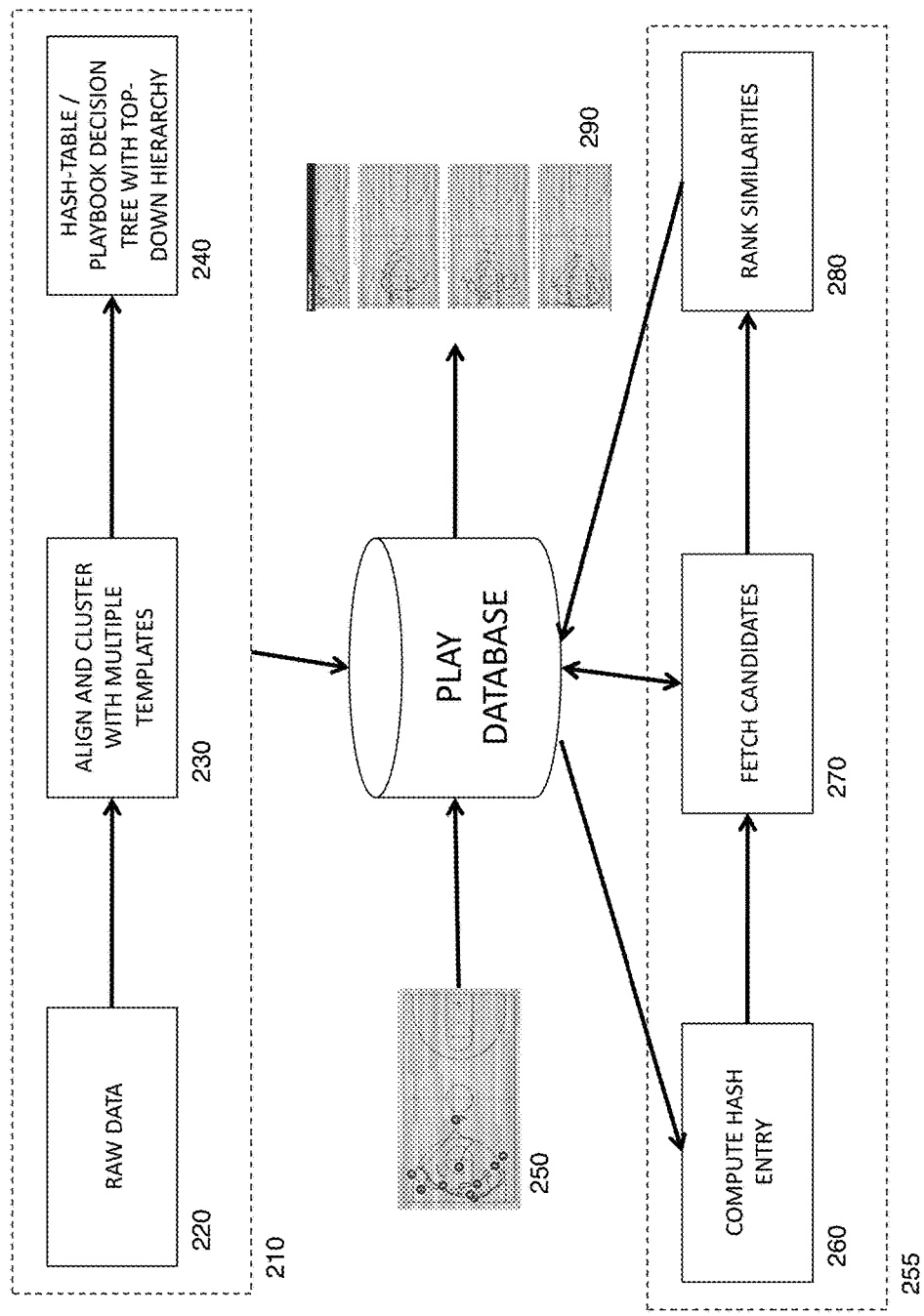
FIG. 2 is a diagram illustrating a general method for performing interactive sports analytics, according to an embodiment of the present system.

Turning to FIG. 2, the general process of pre-processing and retrieving plays from a play database is shown, in accordance with an embodiment. In a pre-processing phase 210, the raw positional data 220 is aligned and clustered using multiple templates at a step 230. At a pre-processing step 240, the multiply-aligned plays are discriminatively clustered using a top-down hierarchical approach to form a hash table/decision tree that acts as a playbook, cataloging the plays for efficient retrieval by similarity and various classification metrics. Once the database has been pre-processed, an input query 250 to the database, consisting of a graphical representation of a play and other possible constraints or metrics, can be processed during a retrieval phase 255. The retrieval process begins by computing a hash value for the play at a step 260, and navigating the hash table/decision tree to fetch similar candidates at step 270. The candidates are ranked at step 280 and the top candidates are returned as the result at step 290.

Trajectory Alignment using Multiple Templates

Figure 3:
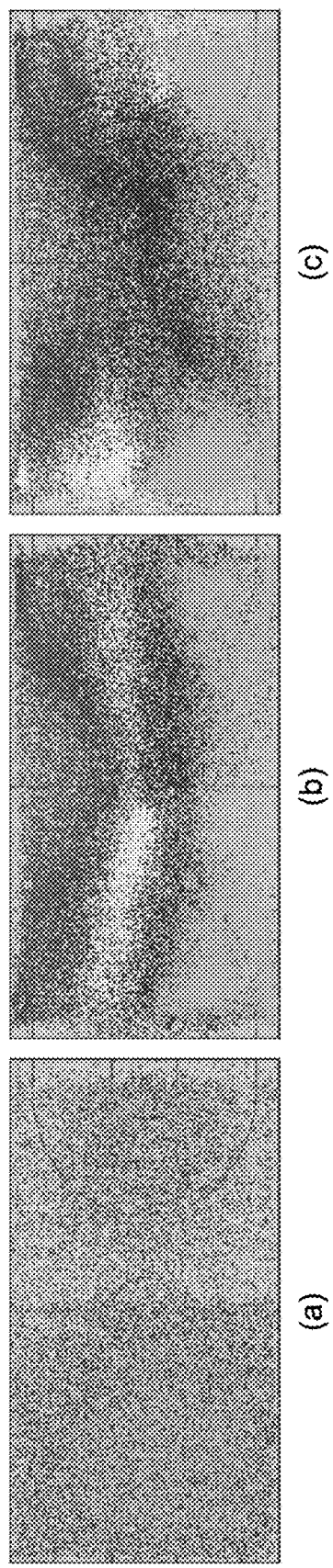
FIG. 3 is a graphic diagram illustrating the use of alignment of positional sports player data, in accordance with an embodiment of the present system.

In an embodiment, the alignment of plays is performed using multiple templates. An example of misalignment of tracking data is illustrated in FIG. 3. FIG. 3a indicates the locations of five basketball player positions in one quarter of a game. There is little distinctiveness to any of the players, particularly on the offensive end of the court. FIG. 3b illustrates player positions after aligning the plays based on their role (point guard, shooting guard, center, etc.) However, because the plays have been aligned to only single template, there is little variation shown between offensive and defensive positioning for each player role. FIG. 3c illustrates player positions after aligning plays with multiple-templates using a tree-based representation in accordance with an embodiment of the present system, showing greater definition and distinctiveness between a player's positioning on offense (left half) and defense (right half).

In an embodiment, the present system performs alignment using multiple templates. Given M agents (players, ball, and/or other objects to be tracked), and their two-dimensional continuous raw positions, the dataset of multi-agent behavior D consisting of length F frames is represented as a concatenated sequence of (x, y) points:

$$D_{F \times M} = \begin{bmatrix} X_1^1 & \cdots & X_M^1 \\ \vdots & \ddots & \vdots \\ X_1^F & \cdots & X_M^F \end{bmatrix} \quad (1)$$

where $x_j^i = [x_j^i, y_j^i]$ denotes the two-dimensional coordinates of the $j^{th}$ agent at the $i^{th}$ time instance and $X_j$ is the representation of all M agents for the $j^{th}$ frame.

Spatial alignment is performed by finding a set of permutation matrices with the objective of maximizing the similarity of the data. That is, a set of M permutation matrices, $\Phi = \{P_1, \ldots, P_M\}$ is constructed such that the total similarity is maximized (or the total entropy is minimized). Given that the similarity between two frames of data can be measured as the negative Euclidean distance $-\|X_i - X_k\|_2$, the objective is to maximize the following $$\operatorname{argmax}_\Phi \sum_{i=1}^{F} \sum_{k=1}^{F} -\|\Phi_i(P)X_i - \Phi_k(P)X_k\|_2 \quad (2)$$

The multiple template approach of the present system improves the alignment, maximizing the similarity of the data (or minimizing the reconstruction error when using the learned templates). In addition, the benefit of discovering multiple templates permits higher-level features or latent factors that can be used to personalize queries by matching specific contexts and conditions.

Figure 4:
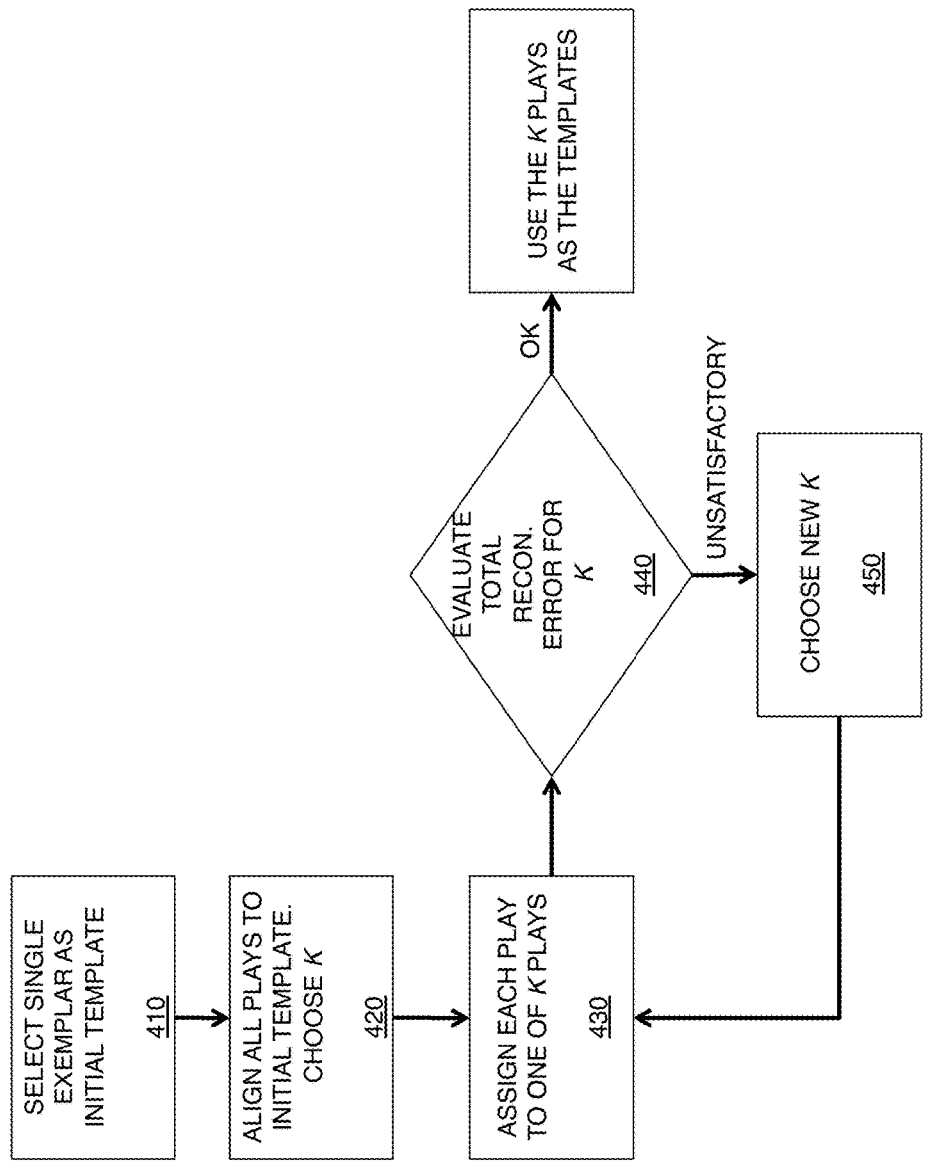
FIG. 4 is a flow diagram illustrating a method of aligning sports plays using multiple templates, in accordance with an embodiment of the present system.

Turning to FIG. 4, a method is described of finding multiple templates directly from raw trajectory data, in accordance with an embodiment. At step 410, a single exemplar play of interest is selected as the initial template. The initial template can be a random sample, or found using previous single template methods, such as those described in Lucey et al., "Representing and Discovering Adversarial Team Behaviors using Player Roles," Computer Vision and Pattern Recognition (2013), which is incorporated by reference for all that it teaches.

At step 420, all plays in the database are aligned to the initial template by calculating the cost matrix, which consists of finding the distance (such as L2 distance) between each trajectory in the template and each trajectory in the candidate play. The permutation matrix is calculated using known techniques (for example, the Hungarian algorithm), and the candidate play is accordingly permuted to align it to the template.

At step 430, a value of K is chosen and a clustering algorithm (e.g., K-means, agglomerative clustering, affinity propagation) is used to assign each play of the database to one of K plays. The total reconstruction error is measured for the K clusters.

At step 440, the total reconstruction error for K is compared to a desired threshold value. If the total reconstruction error for K is less than the threshold, the K plays are used as the multiple templates, and the process terminates. Otherwise, at step 450, a new value for K is chosen, and the clustering algorithm is run again at step 430. Alternatively, a different threshold function is used, such as if K exceeds some number. Alternatively, the total reconstruction error for each iteration is compared, and the value of K yielding the minimal reconstruction error after some time period or number of iterations is selected.

Another alternative, as used in an embodiment, is a matching-pursuit type approach to find a suitable set of K templates. Beginning with K=1, the exemplar which can best represent the data is found. This exemplar is added it to the dictionary of exemplars, and K is incremented to K=2 to find the next best exemplar to represent the data. This process continues until some desired criterion is met.

The method of finding multiple templates described above with respect to FIG. 4 has advantages over methods, such as hand-crafting features by an expert which encodes and discriminates the semantics of the behavior of interest (for example, if an expert were to code a "pick-and-roll" play in basketball). The expert-selection method is problematic as it is lossy (it only selects a few agents of interest), and creates an over-complete feature representation which would need to be reduced. In contrast, the method of FIG. 4 corresponds to merely an added column in the database which corresponds to the best permutation, making clustering, retrieving and short-term prediction easy and interpretable.

Hash-Table/Playbook Learning

For retrieval tasks using large amounts of data, an embodiment of the system uses a hash-table is required by grouping similar plays together, such that when a query is made, only the "most-likely" candidates are retrieved. Comparisons can then be made locally amongst the candidates and each play in these groups are ranked in order of most similar. Previous systems attempted clustering plays into similar groups by using only one attribute, such as the trajectory of the ball. However, the semantics of a play are more accurately captured by using additional information, such as information about the players (e.g., identity, trajectory, etc.) and events (pass, dribble, shot, etc.), as well as contextual information (e.g., if team is winning or losing, how much time remaining, etc.). Thus, embodiments of the present system utilize information regarding the trajectories of the ball and the players, as well as game events and contexts, to create a hash-table, effectively learning a "playbook" of representative plays for a team or player's behavior. The playbook is learned by choosing a classification metric that is indicative of interesting or discriminative plays. Suitable classification metrics may include predicting the probability of scoring in soccer or basketball (e.g., expected point value ("EPV"), or expected goal value ("EGV"), as described in Miller et al. ("Factorized Point Process Intensities: A Spatial Analysis of Professional Basketball," in ICML, 2014) and Lucey, et al. ("Quality vs quantity": Improved shot prediction in soccer using strategic features from spatiotemporal data," in MIT Sloan Sports Analytics Conference, 2015), which are hereby incorporated by reference. Other predicted values can also be chosen for performance variables, such as probability of making a pass, probability of shooting, probability of moving in a certain direction/trajectory, or the probability of fatigue/injury of a player.

The classification metric is used to learn a decision-tree, which is a coarse-to-fine hierarchical method, where at each node a question is posed which splits the data into groups. A benefit of this approach is that it can be interpretable and is multi-layered, which can act as "latent factors."

Bottom-Up Approach

In an embodiment of the system, a bottom-up approach to learning the decision tree is used. Various features are used in succession to discriminate between plays (e.g., first use the ball, then the player who is closest to the ball, then the defender etc.). By aligning the trajectories, there is a point of reference for trajectories relative to their current position. This permits more specific questions while remaining general (e.g., if a player is in the role of "point guard", what is the distance from his/her teammate in the role of "shooting guard", as well as the distance from the defender in the role of "point guard"). Using this approach avoids the need to exhaustively check all distances, which is enormous for both basketball and soccer.

Top-Down Approach

Figure 5:
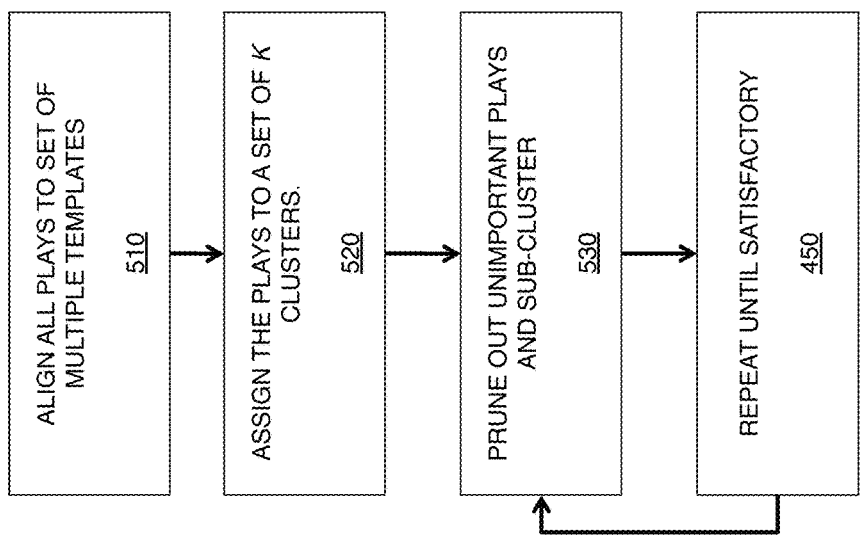
FIG. 5 is a flow diagram illustrating a top down method of learning a decision-tree for sports plays, in accordance with an embodiment of the present system.

In another embodiment of the system, a top-down approach to learning the decision tree is used. An example of the top-down approach is described with respect to FIG. 5. At step 510, all the plays are aligned to the set of templates. From this initial set of templates, at step 520 the plays are assigned to a set of K groups (clusters), using all ball and player information, forming Layer 1 of the decision tree. Back propagation is then used at step 530 to prune out unimportant players and divide each cluster into sub-clusters (Layer 2). The approach continues at step 540 until the leaves of the tree represent a dictionary of plays which are predictive of a particular task—i.e., goal-scoring (Layer 3).

Figure 6:
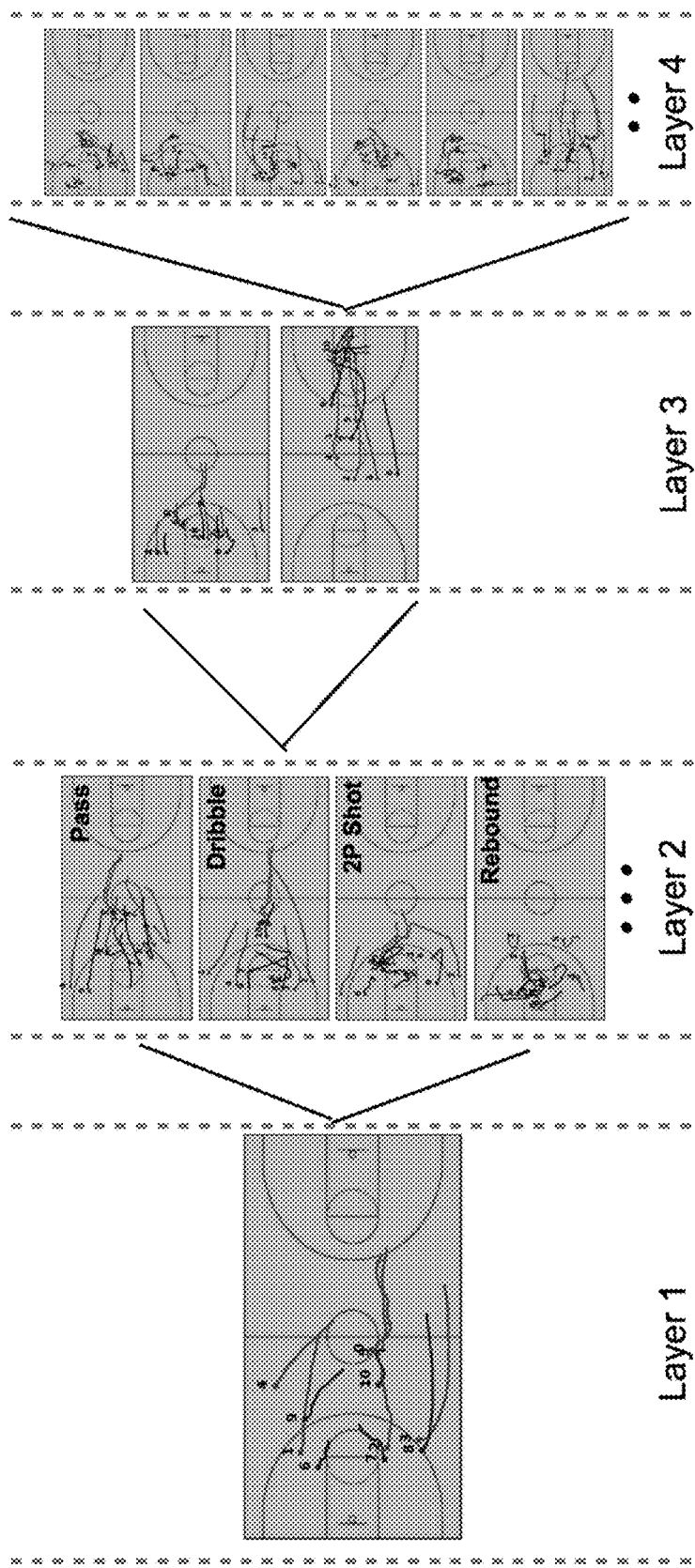
FIG. 6 is an illustration of an application of a top down method of learning a decision-tree for sports plays, in accordance with an embodiment of the present system.

An example of applying the top-down approach is shown in FIG. 6. Beginning with one exemplar template (Layer 1), all basketball plays are first aligned to the exemplar and clustered into K groups using all player and ball information, shown in Layer 2. Back-propogation is then used to prune out unimportant players and then to divide each cluster into sub-clusters, shown in Layer 3. This approach is continued until there is a "dictionary" of plays which are sufficiently predictive of a particular task, such as field goal-scoring, shown in Layer 4.

Personalization using Latent Factor Models

In addition to raw trajectory information, in embodiments of the system, the plays in the database are also associated with game event information and context information. The game events and contexts in the database for a play may be inferred directly from the raw positional tracking data (e.g., a made or missed basket), or may be manually entered. Role information for players (e.g., point guard, shooting guard, center) can also be either inferred from the positional tracking data or entered separately. In embodiments of the system, a model for the database can then be trained by crafting features which encode game specific information based on the positional and game data (e.g., distance from basket/goal, distance from defenders, particular events, etc.), and then calculating a prediction value (between 0 and 1) with respect to a classification metric (e.g., expected point value).

If there are a sufficient number of examples, the database model can be personalized for a particular player or game situation using those examples. In practice, however, a specific player or game situation may not be adequately represented by plays in the database. Thus, embodiments of the system find examples which are similar to the situation of interest—whether that be finding players who have similar characteristics or teams who play in a similar manner. A more general representation of a player and/or team is used, whereby instead of using the explicit team identity (i.e., James as a player, or Manchester United as a team), each player or team is represented as a distribution of specific attributes, in a manner such as described by Yue, et al. ("Learning Fine-Grained Spatial Models for Dynamic Sports Play Prediction," in ICDM, 2014), Miller et al. ("Factorized Point Process Intensities: A Spatial Analysis of Professional Basketball," in ICML, 2014) and Wei et al. ("Predicting serves in tennis using style priors," in KDD, 2015), which are hereby incorporated by reference.

Figure 7:
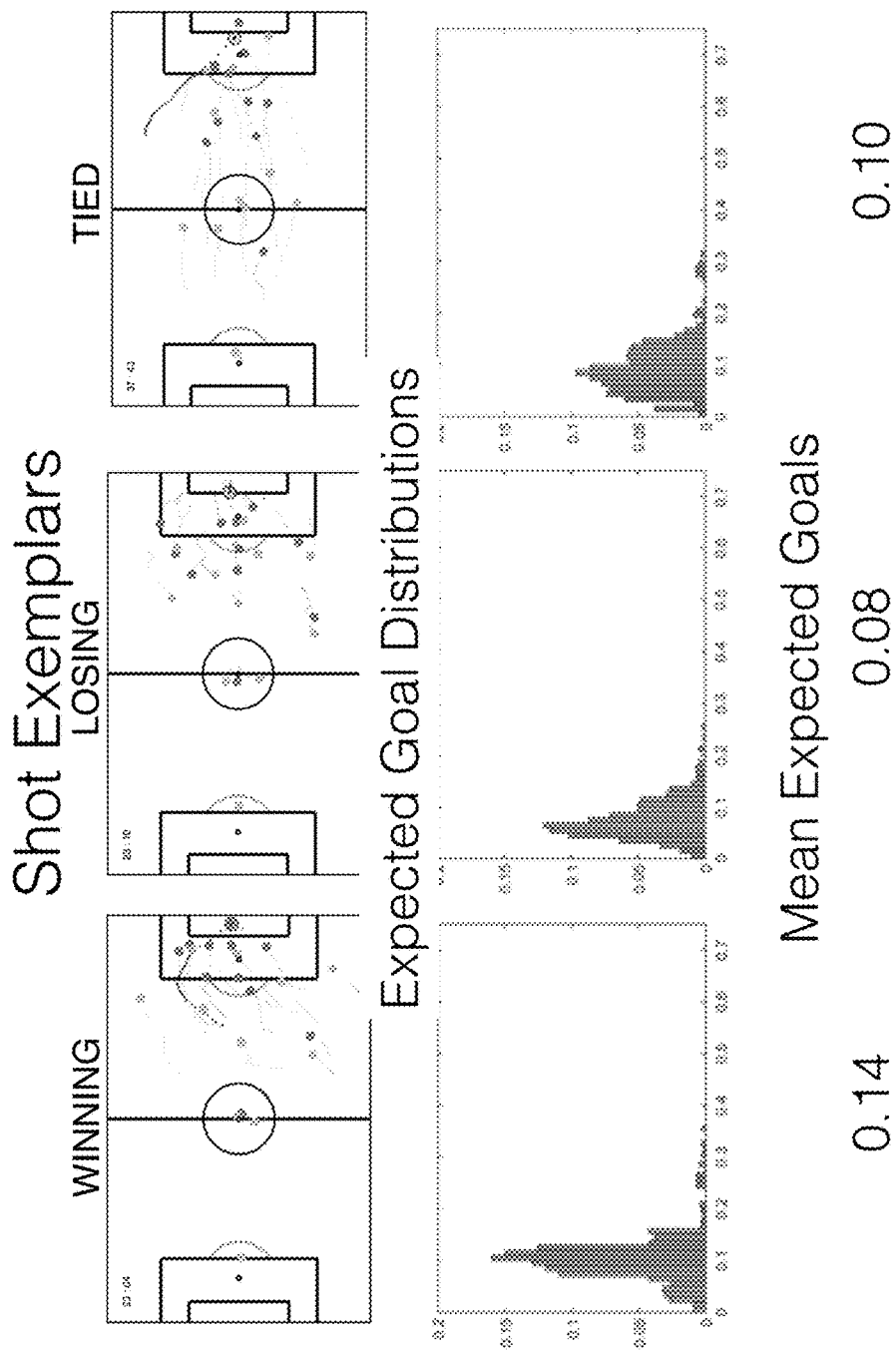
FIG. 7 is a diagram illustrating an example application of an interactive sports analytics system, in accordance with an embodiment of the present system.

Embodiments of the system use the plays in the hash-table/playbook that were learned through the distributive clustering processes described above. As an example, FIG. 7 shows the results of one implementation where the game-context for a particular soccer team has been used with a database of soccer plays in accordance with an embodiment. In the example of FIG. 7, the database of plays was aligned to multiple templates and distributively clustered on criteria including game-context (i.e., whether the team was winning, losing, or tied). Using the classifying metric of expected goal value, different goal scoring plays are retrieved from the database depending on the game-context. That is, when winning, the most likely shooting method is a counter-attack. When losing, the most likely shooting method is on a slower attack. The mean EGV for these situations is shown to be 14% when winning, 8% when losing, and 10% when tied. This information is useful for determining a team's strategy, and also allows performing more accurate match prediction generally by modeling a team's behavior for different match context depending on the strength/weaknesses of their attributes.

Figure 8:
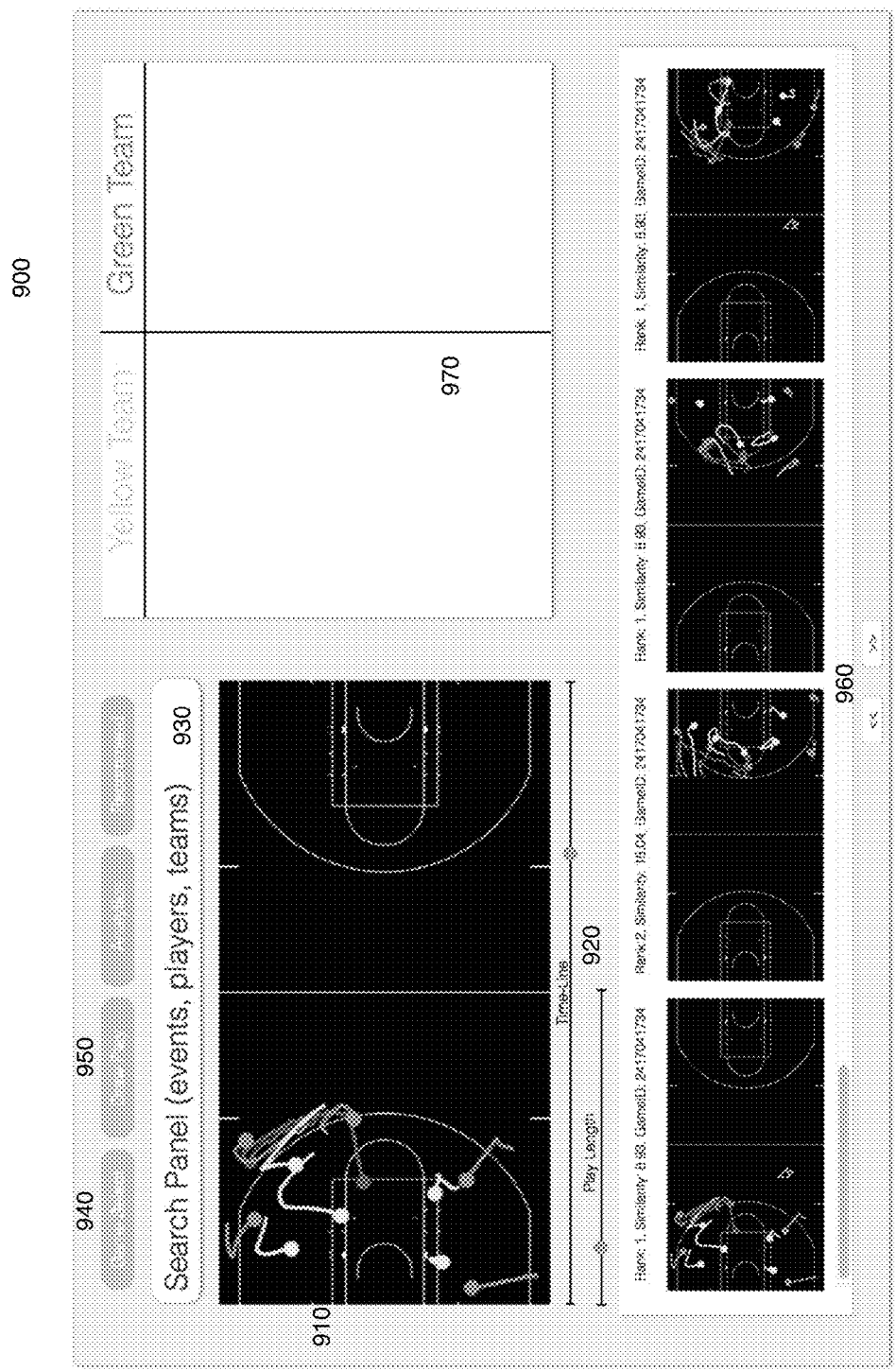
FIG. 8 is an illustration of an interactive sports analytics interface, in accordance with an embodiment of the present system.

Turning to FIG. 8, an example user interface 900 is shown for use in accordance with embodiments of the system to perform interactive analytics for a basketball game. A first interactive panel 910 displays the current play at issue, including graphical depictions of the players (circles) and their recent trajectories (tails), as well as the ball. Sliders 920 permit the user to select the play length window to be analyzed, and to see a timeline for the entire length of the play. The play is initially either loaded from the database (for example, as a result of a user search through a search panel 930 and/or a Game Select button 940), or drawn by the user using a touchscreen, stylus, keyboard or other input device (for example, after a user's selection of a Draw Play option 950). Once entered or selected, the interface uses this play as an input query to the database and retrieves similar plays to display in a retrieved play panel 960. In an embodiment, an additional panel on the interface is used to display actual video footage from the archived game, corresponding to a user's selection of one of the retrieved plays, synchronized to the graphical depiction. An additional player selection panel 970 is presented to allow the user to assign or manipulate team players to the graphical depictions in the first interactive panel 910.

Figure 9A:
FIGS. 9a-9d are illustrations of an interactive sports analytics interface, in accordance with an embodiment of the present system.
Figure 9B:
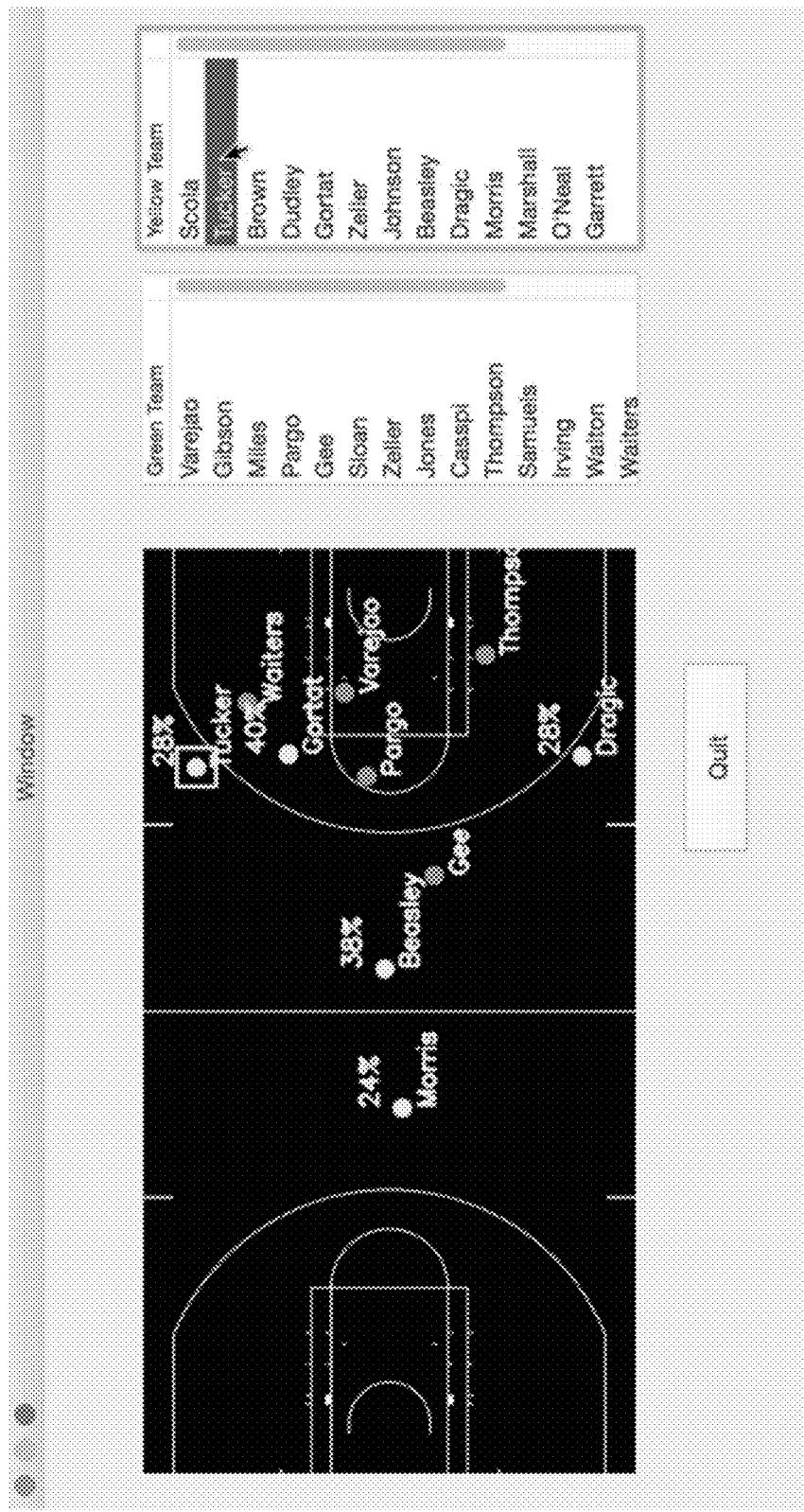
Figure 9C:
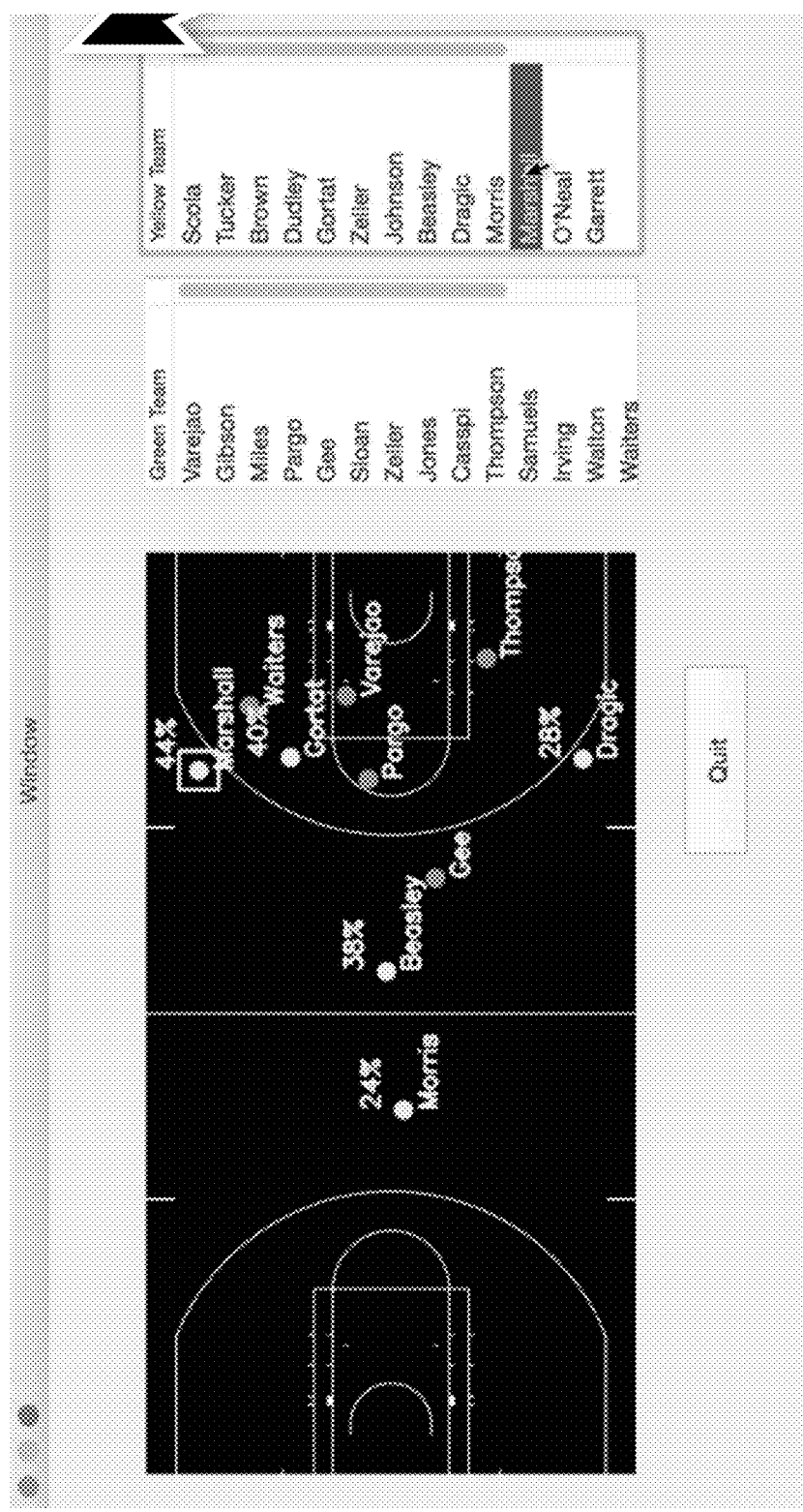
Figure 9D:
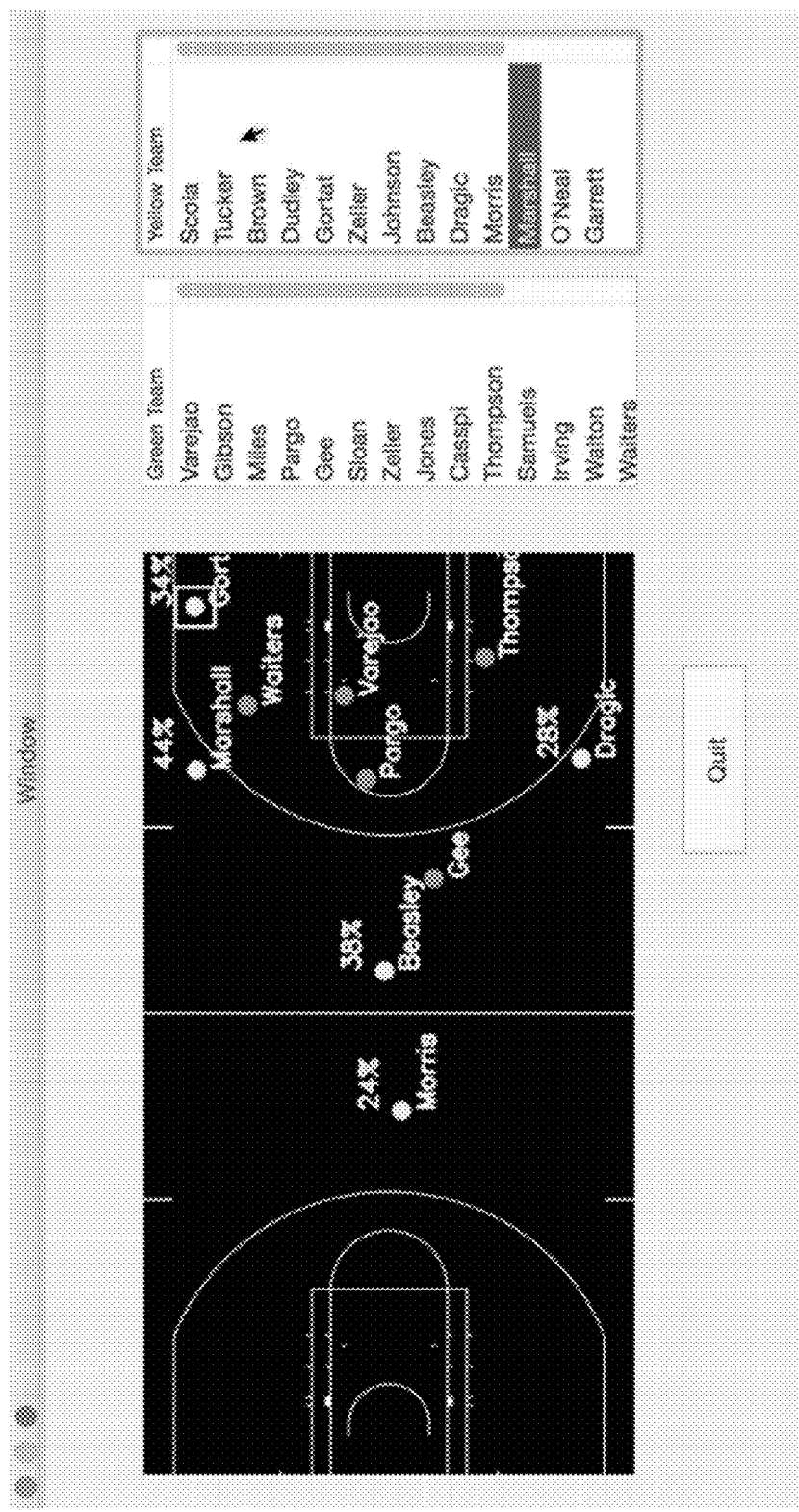

Turning to FIG. 9a, another example user interface is shown for use in interactive analysis of a basketball game, in accordance with an embodiment. In this example, the positions of the ten players are shown graphically, and identified by the players' names. Additionally, the offensive team players display the EPV given the current game configuration. Using the interactive panel, the user in this example has selected one player, "Brown," whose EPV in the situation is 0.34. In FIG. 9b, the user selects one of the players, "Tucker", from a player selection panel, causing the interactive display panel to update using statistical information retrieved for similar plays from the database. In particular, the system updates the EPV for Tucker, to 0.28, indicating that Tucker is not expected to perform as well offensively in this situation as compared to Brown. In FIG. 9c, the user has swapped Tucker with "Marshall" using the player selection panel, and Marshall's updated EPV of 0.44 is presented, based on the statistical information retrieved for similar plays from the database. Turning to FIG. 9d, using the interface, the user has moved the position of the graphical depiction of one player, "Gortat," and the player's corresponding EPV is updated by the system from 0.40 to 0.34, indicating that Gortat is less likely to be offensively productive in this proposed position. Alternatively, in addition to swapping a player, embodiments of the system calculate statistical values based on the swapping of the team surrounding the player. For example, if the same player now plays for a different team, the system can calculate the change in the player's likelihood of being offensively productive with different teammates in the same situation.

Figure 10A:
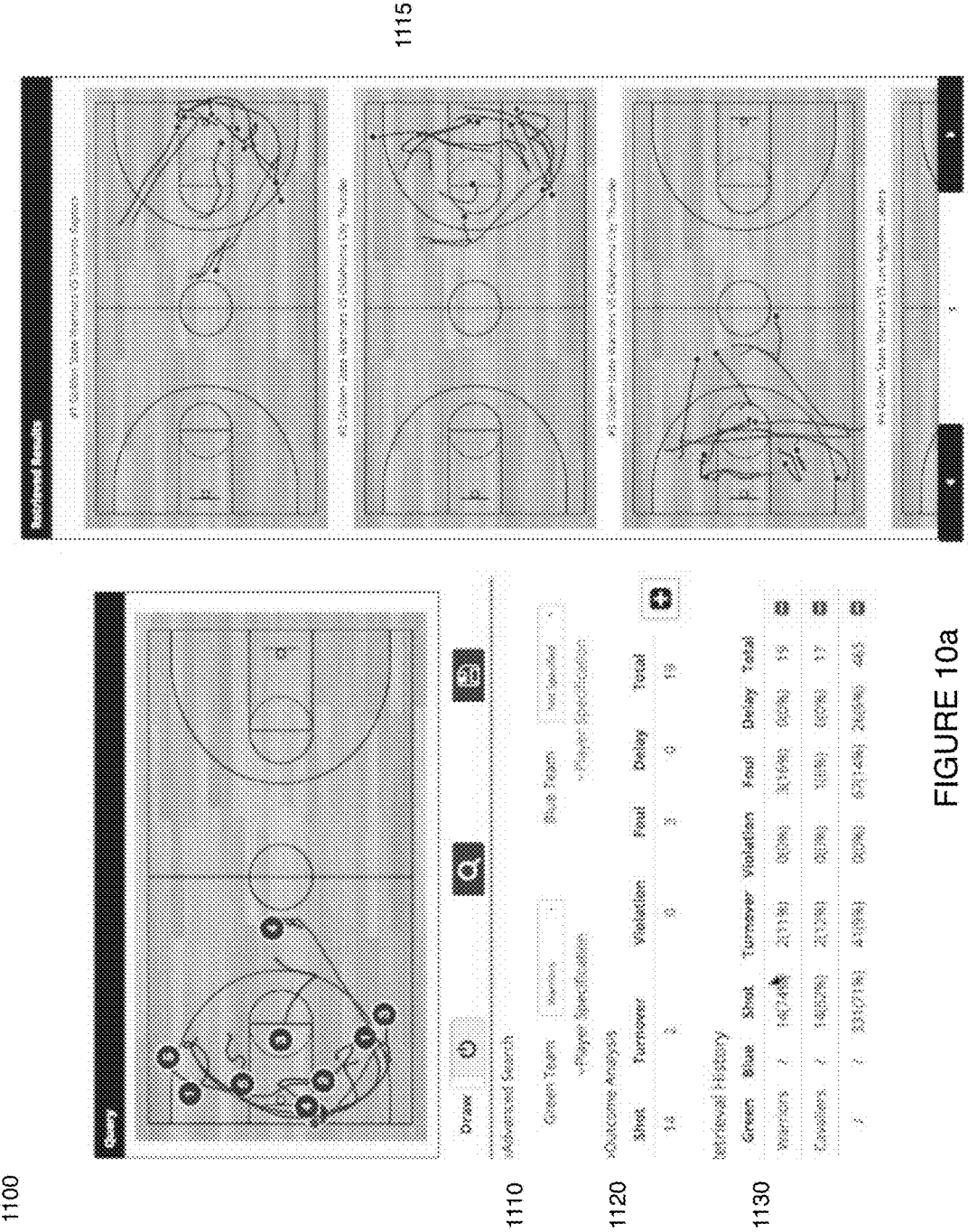
FIGS. 10a-10b are illustrations of an interactive sports analytics interface, in accordance with an embodiment of the present system.

Turning to FIG. 10a, another example user interface 1100 is shown of use in interactive analysis of a basketball game, in accordance with an embodiment. A set of advanced searching options 1110 are presented, allowing the user to restrict the database search to particular subsets of plays. In this example, the user has restricted the "Green Team" (on offense here) to be the Warriors, while the "Blue Team" (on defense here) is unrestricted. Other restrictions might be based on the game context (e.g., less than 2 minutes left in game, first 5 minutes of game, time of day (day game vs. night game), particular player on the court, etc.). The retrieved similar plays 1115 from the database query are displayed on the right. An Outcome Analysis section 1120 for the query displays statistical results for the retrieved plays, i.e., out of 19 results, 14 led to a shot, 2 to a turnover, and 3 to a foul. A Retrieval History section 1130 of the display indicates the statistical results from past queries of the situation. In this example, a previous result for limiting the query to the Cavaliers is shown (17 results), along with an unrestricted query of all similar plays (465 results).

Figure 10B:
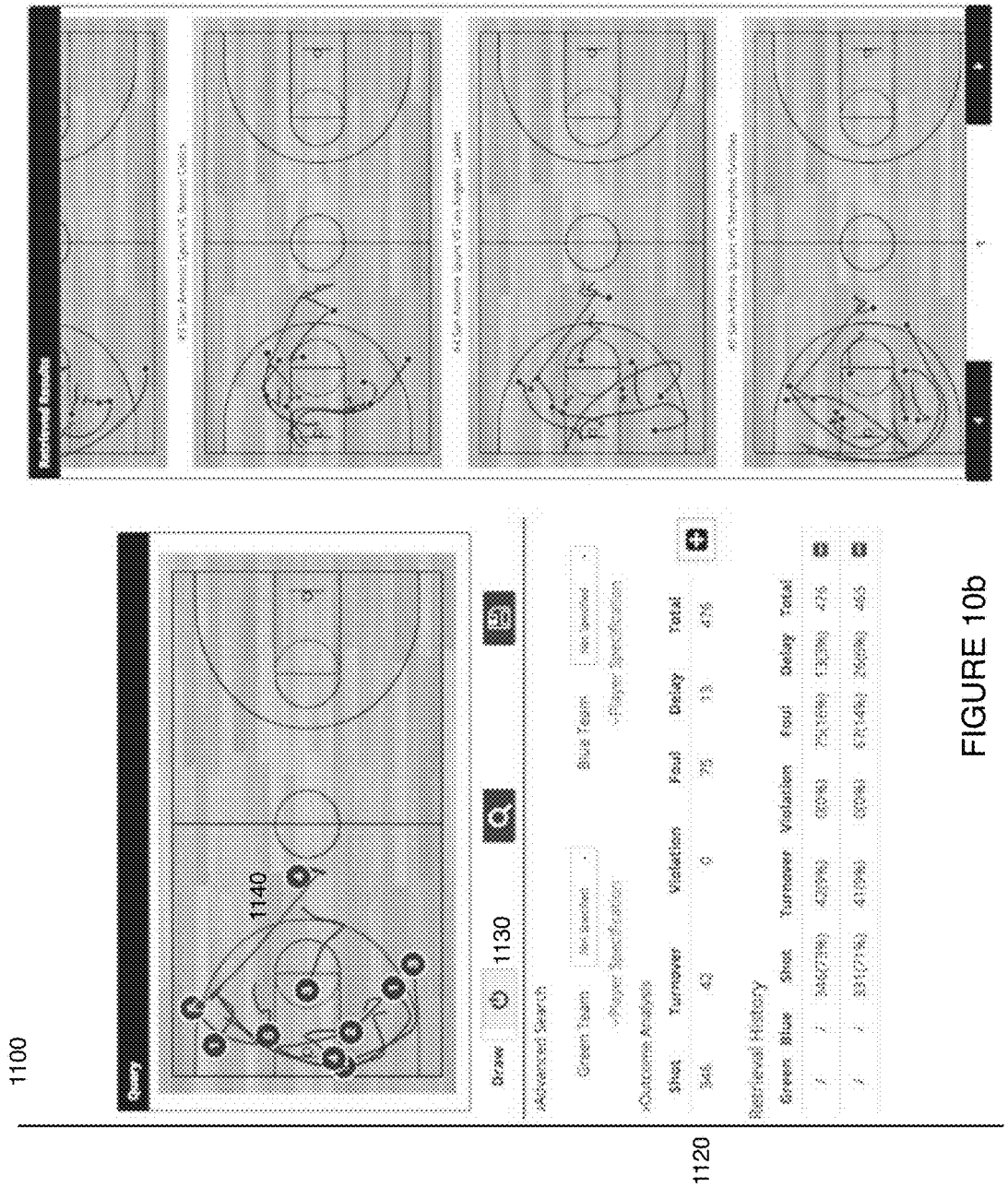

In FIG. 10b, the user has used the interface 1100 to manipulate the trajectory of the ball 1140 using a Draw option 1150. Whereas the original play had indicated a pass from Green Player 4 to Player 3 to Player 2, the new proposed play indicates a pass from Green Player 4 to Player 5. The interface queries the database accordingly to retrieve similar plays 1160, displayed on the right. Again, the Outcome Analysis section 1120 is updated according to the query results and can be compared to the Retrieval History section 1130, indicating that the proposed play increases the likelihood of taking a shot (from 71% to 73%) and the likelihood of being fouled (from 14% to 16%).

In addition to the examples of basketball and soccer described throughout this disclosure, embodiments of the system are not limited to these particular sports, and the system is suitable for use in a variety of other sports, including but not limited to, for example, rugby, volleyball and American football.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method for interacting with a user via a graphical computer interface to interactively analyze a play of a sports game, the sports game having been tracked with a tracking system to record two-dimensional positional information for objects on the playing surface and event data having been determined for the game and associated with the two-dimensional positional information, and the play having been retrieved from a database of historical plays and event information and loaded onto the interface, the method comprising:

displaying a graphical depiction of the play on the interface, the graphical depiction representing the play retrieved from the database and including a representation of the playing surface and including markers representing positions of tracked objects at a given point in time;

presenting a statistical value for an aspect of the play at the given point in time, the statistical value generated from the database of historical plays and event information;

receiving a proposed modification to the graphical depiction of the play in the interface, via user interaction with at least one marker;

querying the database with the proposed modified play;

obtaining from the database a statistical value for the aspect of the proposed modified play, the updated statistical value being generated based on the historical plays and the game event information in the database; and updating the presented statistical value with the obtained value for the aspect of the proposed modified play.

2. The method of claim 1, wherein the one marker represents a first player, and the proposed modification is a substitution of a second player for the first player.

3. The method of claim 1, wherein the one marker represents a ball, and the proposed modification is a relocation of the ball.

4. The method of claim 1 further comprising:

presenting an animation of the graphical depiction of the play for a window of time according to the tracked positional information, the animation including a depiction of object trajectories over the time window; and displaying a user-selectable interface option for refinement of the time window;

wherein the proposed modification is a change in the trajectory of an object during the time window.

5. The method of claim 1 further comprising:

obtaining from the database a ranked listing of historical plays according to a calculated similarity to the queried play, the similarity based on at least one of: positional information; event information; contextual information; and presenting a graphical depiction of one or more of the most similar historical plays on the interface.

6. The method of claim 5 further comprising:

obtaining real-world video corresponding to the presented most similar historical plays; and playing the video via the interface.

7. The method of claim 1, wherein the given sport is basketball and the statistical value is an expected point value for a player.

8. The method of claim 1, wherein the given sport is soccer and the statistical value is an expected goal value.

9. A method for indexing a database of plays for a sport, each play including two-dimensional positional tracking data for the objects on a playing surface and a time interval, the method comprising:

selecting a first play for use as a first template;

determining a set of plays for use as additional templates;

aligning the plays in the database to each of the templates, representing each aligned play in the database with a permutation matrix for the play; and discriminatively clustering the aligned plays in a top-down hierarchical manner to form a hash table/decision tree;

wherein determining the additional templates comprises:
calculating a cost matrix for each play in the database with respect to the first template, the cost matrix representing a quantitative difference between the trajectories of each tracked object in the play and each object in the template;
determining a permutation matrix for the play with respect to the first template;
choosing a value K>1;
clustering the plays in the database to assign them into K clusters around K candidate plays;
calculating the total reconstruction error for the K clusters, and using the K candidate plays as the additional templates if the total reconstruction error is less than a desired threshold value.

10. The method of claim 9, wherein discriminatively clustering the aligned plays comprises:
assigning each aligned play to one of the K clusters using the two-dimensional tracking data for the objects in the play to form a first level of the hash table/decision tree;
calculating a value of a classification metric for each play in the first-level clusters;
applying a back-propagation technique to each play in the first-level clusters to determine a subset of objects whose trajectory information contributes significantly to the value of the classification metric, and adjusting weights for the objects classification metric correspondingly; and
assigning each aligned play of a first-level cluster to a second-level sub-cluster, based on application of the re-weighted classification metric.

11. The method of claim 10, wherein the sport is one of: basketball, soccer, rugby, American football or volleyball.

* * * * *